(12) United States Patent
Munro et al.

(10) Patent No.: US 7,554,080 B2
(45) Date of Patent: Jun. 30, 2009

(54) ENTANGLEMENT PROCESSES AND SYSTEM

(75) Inventors: William J. Munro, Bristol (GB); Timothy P. Spiller, Portishead (GB); Sean D. Barrett, London (GB); Pieter Kok, Oxford (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 226 days.

(21) Appl. No.: 11/632,596

(22) PCT Filed: Jul. 13, 2005

(86) PCT No.: PCT/US2005/024918

§ 371 (c)(1), (2), (4) Date: Jan. 12, 2007

(87) PCT Pub. No.: WO2006/019858

PCT Pub. Date: Feb. 23, 2006

(65) Prior Publication Data

US 2007/0252081 A1  Nov. 1, 2007

(30) Foreign Application Priority Data

Jul. 14, 2004 (GB) ................... 0415742.6

(51) Int. Cl.
*H01S 4/00* (2006.01)
*H01S 3/00* (2006.01)
*H01S 5/00* (2006.01)
*G06E 3/00* (2006.01)

(52) U.S. Cl. ................ 250/251; 250/493.1; 250/494.1; 250/503.1

(58) Field of Classification Search ............. 250/251, 250/305, 493.1, 494.1, 495.1, 503.1
See application file for complete search history.

(56) References Cited

U.S. PATENT DOCUMENTS

| | | | | |
|---|---|---|---|---|
| 2004/0200952 A1* | 10/2004 | Beausoleil et al. | ........ | 250/214.1 |
| 2005/0117836 A1* | 6/2005 | Franson et al. | ................ | 385/15 |
| 2008/0086438 A1* | 4/2008 | Amin et al. | ................... | 706/33 |
| 2008/0212186 A1* | 9/2008 | Zoller et al. | ................ | 359/577 |

FOREIGN PATENT DOCUMENTS

| WO | WO 03/021527 A2 | 3/2003 |
|---|---|---|
| WO | WO 2004/013808 A2 | 2/2004 |

OTHER PUBLICATIONS

Hsu, "Nonlocality Swapping", May 2002, Physical Review A vol. 65.*

(Continued)

*Primary Examiner*—Jack I Berman
*Assistant Examiner*—Nicole Ippolito Rausch (57) ABSTRACT

The states of matter system (110) having only ones basis state that couples to an excited state can be entangled using measurements of photons during transitions from the excited state. High efficiency of entanglement operation can be achieved by repeating the measurements after performing bit flips on the matter systems (110). High efficiency of entanglement operation can be achieved using non-absorbing parity measurements on the emitted photons so that measured photons can be subsequently manipulated and measured to near-deterministically produce entangled states. Such entanglement operations can be employed to construct cluster states suitable for simulating arbitrary logic networks.

27 Claims, 5 Drawing Sheets

OTHER PUBLICATIONS

Pan, Jian-Wei et al., "Entanglement purification for quantum communication" Nature, (Apr. 26, 2001) vol. 410, No. 6832, pp. 1067-1070, XP-002410779.

Ye, Liu et al., "Scheme for entanglement concentration of atomic entangled states in cavity QED", Physics Letters, (Jul. 5, 2004) vol. 327, No. 4, pp. 284-289.

Zhi, Zhao et al., "Practical Scheme for entanglement concentration" Physical Review A, (Jul. 2001) vol. 64, No. 1, pp. 014301/1-014301/3, XP002410777.

Barrett, Sean, "Efficient High-fidelity Quantum Computation Using Matter Qubits and Linear Optics" Physical Review A, (2005) vol. 71, pp. 060310/1-060310/4, XP002434478.

Browne, Daniel, "Resource-Efficient Linear Optical Quantum Computation", Physical Review Letters, (2005) vol. 95, pp. 010501/1-010501/4, XP002434474.

Pittman, Todd, "Heralded Two-photon Entanglement From Probabilistic Quantum Logic Operations on Multiple Parametric Down-Conversion Sources" IEEE(2003) 9:6:1478-82,XP002434476.

Pryde, G.J., "Measuring a Photonic Qubit Without Destroying It" Physical Review Letters (2004) vol. 92, No. 19, pp. 190402/1-190402/4, XP002434477.

Nielsen, Michael, "Fault-tolerant Quantum Computation With Cluster States" Physical Review A (2005) vol. 71, pp. 042323/1-26, XP002434475.

* cited by examiner

ENTANGLEMENT PROCESSES AND SYSTEM

BACKGROUND

Many physical implementations of quantum computers have been proposed. Knill, Laflamme, and Milburn, Nature 409, 26 (2001), for example, proposed a quantum computing system using optical qubits manipulated with linear optics. Alternatively, optical quantum information systems can use the "cluster state model" of quantum computation introduced by R. Raussendorf and H. Briegel, Phys. Rev. Lett. 86, 5188 (2001). The cluster state model requires the generation of a specific entangled state (or the cluster state), augmented by single qubit measurements in arbitrary bases, or, equivalently, arbitrary single qubit operations together with single-qubit measurements in a particular basis. Linear optical quantum computing (LOQC) systems can eliminate the need for a direct interaction between photonic qubits by using measurement-induced nonlinearities, but generally require a quantum memory for photons, which may be difficult to implement.

Some other particularly promising proposals for quantum computing systems implement unitary operations and read-out in matter qubits via laser-driven optical transitions. Examples of these systems include ion-trap systems such as described by J. Cirac and P. Zoller, Phys. Rev. Lett. 74, 4091 (1995), system using nitrogen-vacancy (N-V) defects in diamond as described by Jelezko et al., Phys. Rev. Lett. 92, 076401 (2004), and systems using the Pauli-blockade effect in quantum dots with a single excess electron as described by Pazy et al., Europhys. Lett 62, 175 (2003) or by Nazir et al., Phys. Rev. Lett. 93, 150502 (2004). However, many of the systems using optical addressing or readout of matter qubits also use a relatively short-range interaction (e.g., the Coulomb interaction) in two-qubit gates. The short effective range of the interactions requires that the interacting matter qubits be close together. In contrast, optical addressing of the qubits requires that the separations between matter qubits be large enough to that the optical pulses can resolve the qubits. The short-range interaction for 2-qubit operations and the optical addressing of the qubits therefore seem to lead to contradictory system requirements. (Quantum computing systems implemented using ion traps can avoid this contradiction but must use mini-trap arrays or moving qubits to obtain scalability.)

Systems and methods for efficiently producing remote interaction of stationary qubits, for example, for high-fidelity entanglement of static qubits are thus sought.

SUMMARY

In accordance with an aspect of the invention, a process can use photon measurements to entangle the states of two separated systems. The process generally includes exciting first and second systems using excitations capable of transforming each system from a first state of the system to an excited state of the system. A first measurement of photonic output modes corresponding to transitions from the excited states to the respective first states is performed in a manner that is unable to distinguish whether photons originated from the first or second system. The process then performs the operations capable of transforming the first states of the systems to respective second states of the systems and simultaneously transforming the second states of the systems to the respective first states of the systems. After performing these operations, the process again excites the first and second systems using the excitations that transform the first states to the excited states, before the process performs a second measurement of the photonic output modes. The second measurement is also unable to distinguish whether photons originated from the first or second system. Measurement results of the first and second measurements indicate whether the process successfully entangled quantum states of the first and second systems.

BRIEF DESCRIPTION OF THE DRAWINGS

Use of the same reference symbols in different figures indicates similar or identical items.

DETAILED DESCRIPTION

In accordance with an aspect of the invention, a distributed system uses matter systems for quantum information storage and uses electromagnetic transitions of the matter systems with photon detection to generate entangled states or cluster states of spatially separated matter systems. In accordance with further aspect of the invention, a non-deterministic entanglement operation with any success probability can entangle the states of two spatially separated matter systems or efficiently generate cluster states of many spatially separated matter systems.

Figure 1:
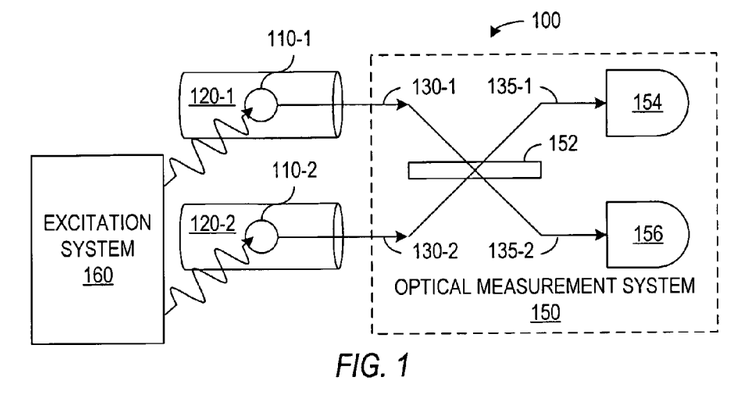
FIG. 1 shows a quantum coherent system in accordance with an embodiment of the invention using measurements of emitted photons to entangle the quantum states of two separated matter systems.

FIG. 1 schematically illustrates an exemplary embodiment of a quantum information system 100 in accordance with an embodiment of the invention. System 100 includes two matter systems 110-1 and 110-2, sometimes referred to generically as matter systems 110. Each matter system 110 has quantum states $|\uparrow\rangle$ and $|\downarrow\rangle$, which may be identified with the basis or logical states $|0\rangle$ and $|1\rangle$ of a qubit. In an exemplary embodiment, states $|\uparrow\rangle$ and $|\downarrow\rangle$ are long-lived, low-lying spin projection states of a matter system such as an atom or molecule. Each matter system 110-1 and 110-2 also has an excited state $|e\rangle$ that is coupled to only one of the states $|\uparrow\rangle$ and $|\downarrow\rangle$ through emission/absorption of a photon. Without loss of generality, the following assumes that excited state $|e\rangle$ couples to state $|\downarrow\rangle$, and that the transition between excited state $|e\rangle$ and state $|\uparrow\rangle$ is forbidden, e.g., by a selection rule. Some known systems that may have suitable quantum energy levels for matter systems 110-1 and 110-2 include N-V defects in diamond such as described by F. Jelezko et al., Phys. Rev. Lett. 92, 076401 (2004), quantum dots with a single excess electron such as described by E. Pazy et al., Europhys. Lett. 62, 175 (2003) or A. Nazir et al., quant-ph/0403225 (2004), and various trapped ion and atomic systems.

Matter systems 110-1 and 110-2 are in respective optical cavities 120-1 and 120-2 sometime generically referred to herein as optical cavities 120. Each optical cavity 120 preferably has a resonant mode corresponding to the wavelength of a photon emitted when the excited state $|e\rangle$ decays. Optical cavities 120-1 and 120-2 are also constructed to preferentially leak electromagnetic radiation to respective photonic modes 130-1 and 130-2, which enter an optical measurement system 150. Leaky optical cavities 120 with a highly preferred direction of light emissions can be constructed using known quantum optics techniques.

Measurement system 150 is ideally capable of measuring a single photon emitted from cavities 120-1 or 120-2 but without distinguishing whether matter system 110-1 or 110-2 is the source of the measured photon. In the illustrated embodiment, measurement system 150 includes a 50-50 beam splitter 152 having photonic modes 130-1 and 130-2 from resonant cavities 120-1 and 120-2 as input modes. Detectors 154 and 156 are positioned to receive and measure the radiation in output modes 135-1 and 135-2 of beam splitter 152.

An excitation system 160 in FIG. 1 operates on matter systems 110-1 and 110-2 as needed to selectively drive one or both of matter systems 110-1 and 110-2 to other energy states and in particular to drive state $|\Downarrow\rangle$ to excited state $|e\rangle$. As noted above, matter systems 110-1 and 110-2 are embedded in separate optical cavities 120-1 and 120-2, and cavities 120-1 and 120-2 can be designed such that only the transition between state $|\Downarrow\rangle$ and $|e\rangle$ is coupled to the resonant mode of cavities 120-1 and 120-2. Accordingly, excitation system 160 can produce a π-pulse that induces a transition to excited state $|e\rangle$ from a component state $|\Downarrow\rangle$ but does not cause the transition to excited state $|e\rangle$ from a component state $|\Uparrow\rangle$, e.g., because of a selection rule based on a conservation law such as conservation of angular momentum or conservation of energy. Excitation system 160 may also be used to induce transitions of matter system 110-1 or 110-2 between states $|\Uparrow\rangle$ and $|\Downarrow\rangle$, e.g., for single-qubit operations, but excitation system 160 may require separate subsystems for the different transitions because of the difference between the energy associated with the transition state $|\Downarrow\rangle$ to state $|\Uparrow\rangle$ and the energy associated with the transition of state $|\Downarrow\rangle$ to state $|e\rangle$.

For illustrative purposes, the following description emphasizes an exemplary embodiment of system 100, which uses N-V defects in diamond for matter systems 110-1 and 110-2. An N-V defect corresponds a nitrogen (N) atom in place of a carbon (C) atom and next to a vacancy in a diamond crystal. Such defects are know have a triplet ground state corresponding to the spin projections −1, 0, and 1 of a spin-one system, and the ground states have a strongly dipole allowed optical transition to a first excited triplet state. An external magnetic field can be applied to a N-V defect to break the degeneracy of the ground state, and two of the triplet states (e.g., the ±1 spin projection states) can then be used as states $|\Uparrow\rangle$ and $|\Downarrow\rangle$. (The third N-V defect state (e.g., with spin projection 0) is normally not required or used when matter systems 120 represent qubits having states $|\Uparrow\rangle$ and $|\Downarrow\rangle$ as basis states.) The transition between an excited state and the ground state of an N-V defect produces a photon having an optical wavelength, permitting uses of conventional optical elements and photodiodes in optical measurement system 150.

The N-V defects in an exemplary embodiment of the invention are in nanocrystallites of high-pressure, high-temperature diamond (type 1b). The nanocrystallites, which may be about 20 nm in diameter, can be embedded in resonant cavities 120-1 and 120-2, which may be formed in and on a wafer or die, for example, as defects within a photonic crystal. The entire structure can then be kept at a temperature that provides a desired coherence time for the states of matter systems 110. In general, the spin states of N-V defects are known to remain coherent for milliseconds at room temperature up to seconds at low temperatures (e.g., about 2° K). Excitation system 160 for N-V defects 110-1 and 110-2 preferably includes a laser capable of producing a short pulse for a π-pulse that efficiently transforms state $|\Downarrow\rangle$ to excited state $|e\rangle$.

Figure 2:
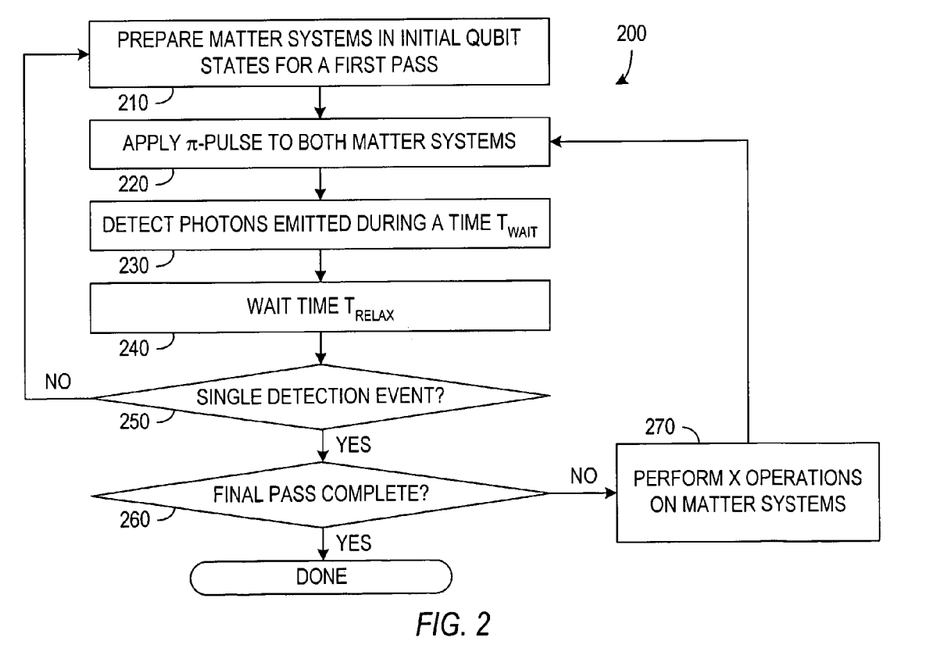
FIGS. 2 is a flow diagram of an entanglement process in accordance with an embodiment of the invention using a double heralding and detectors that may be unable to reliably distinguish a single emitted photon from two emitted photons.

In accordance with an aspect of the invention, system 100 can employ a double-heralded or multiply-heralded entanglement process 200 illustrated in FIG. 2 to entangle the quantum states of matter systems 110-1 and 110-2. Process 200 is double heralded as described below in that a combination of two specific measurement results marks successful production of an entangled state of the spatially separated matter systems 110-1 and 110-2. The double heralding makes the entanglement process robust against measurement errors.

Entanglement process 200 begins as shown in FIG. 2 with a state preparation step 210 that sets one or both matter systems 110-1 and 110-2 into known states, e.g., $$|+\rangle_i = \frac{1}{\sqrt{2}}(|\uparrow\rangle_i + |\downarrow\rangle_i)$$

where index i takes values 1 and 2 respectively corresponding to matter systems 110-1 and 110-2. To illustrate a definite example of an entanglement operation, following assumes that step 210 sets matter systems 110-1 and 110-2 in respective states $|+\rangle_1$ and $|+\rangle_2$ although the entanglement operation can begin with other initial states, eg., $$|-\rangle_i = \frac{1}{\sqrt{2}}(|\uparrow\rangle_i - |\downarrow\rangle_i)$$

or any linear combination of states $|\uparrow\rangle_i$ and $|\downarrow\rangle_i$. With the exemplary initial states $|+\rangle_1$ and $|+\rangle_2$ of the separate matter systems 110-1 and 110-2, the initial state $|\psi_0\rangle$ of in system 100 is a product state as indicated in Equation 1, where states $|0\rangle_1$ and $|0\rangle_2$ correspond to no photons in output modes 130-1 or 130-2.

$$|\psi_0\rangle_i = \frac{1}{\sqrt{2}}(|\uparrow\rangle_1 + |\downarrow\rangle_1) \otimes \frac{1}{\sqrt{2}}(|\uparrow\rangle_2 + |\downarrow\rangle_2) \otimes |0\rangle_1|0\rangle_2 \quad \text{Equation 1}$$
$$= \frac{1}{2}(|\uparrow\uparrow\rangle + |\uparrow\downarrow\rangle + |\downarrow\uparrow\rangle + |\downarrow\downarrow\rangle) \otimes |0\rangle_1|0\rangle_2$$

The specific method for preparing the initial quantum state $|\psi_0\rangle$ will depend on the type of matter system 110 employed. A general process for producing the desired state might include driving the matter system into any known state and then applying local unitary transformations (if necessary) to transform the known state to the desired state. In general, a matter system 110 can be set into a known state, for example, by cooling that the matter system 110 down into a non-degenerate ground state. Alternatively, optical pumping can preferentially populate an excited state, and/or the state can be measured, for example, by detecting an optical transition. Systems and processes for implementing local unitary transformations suitable for preparation of the initial state are generally required in quantum information processing systems and are well known for a variety of quantum systems.

For an N-V defect, an initial state $|+\rangle$ can be created by, for example, by cooling the N-V defect in a magnetic field to produce the lowest energy state $|\uparrow\rangle$ or $|\Downarrow\rangle$ and then performing a single qubit operation to transform the matter system to the desired initial state, e.g., state $|+\rangle$. For example, application of an ESR (Electron Spin Resonance) pulse, i.e., an oscillating magnetic field pulse having a frequency that is resonant with the energy gap between states $|\uparrow\rangle$ and $|\Downarrow\rangle$ and a pulse envelope with a length such that the N-V defect undergoes ¼ of a Rabi cycle, can transform state $|\Downarrow\rangle$ or $|\uparrow\rangle$ to the desired state $|+\rangle$.

Once system 100 is in the desired initial state, step 220 applies optical π-pulses to matter systems 110-1 and 110-2 to coherently pump the population of states $|\Downarrow\rangle_i$ in the initial state $|\psi_0\rangle$ into respective excited states $|e\rangle_i$. As known in the art, a π-pulse generally is a pulse of laser light having a frequency that is resonant to the transition of state $|\Downarrow\rangle$ to excited state $|e\rangle$ and a duration that induces population inversion. The excitation step 220 thus transforms initial product state $|\psi_0\rangle$ to a state $|\psi_1\rangle$ as indicated in Equation 2.

$$|\psi_0\rangle \xrightarrow{\pi-pulses} |\psi_1\rangle = \frac{1}{2}(|\uparrow\uparrow\rangle + |\uparrow e\rangle + |e\uparrow\rangle + |ee\rangle) \otimes |0\rangle_1 |0\rangle_1 \quad \text{Equation 2}$$

Each excited state or states $|e\rangle$ will decay or fluoresce by emitting a photon when transitioning to state $|\Downarrow\rangle$, causing the resonant cavity 120 to later release a photon. In general, the time at which a photon is released is random time but statistically characterized by of the half-lives of excited state $|e\rangle$ and the resonant cavity 120. Step 230 of process 200 waits for a time $T_{WAIT}$ for detection of a photon event in either detector 154 or 156. For a high probability of an emission of from cavities 120-1 and/or 120-2, the time $T_{WAIT}$ should generally be a few times a half life $\Gamma_{slow}^{-1}$, which is the longer of the half life of excited state $|e\rangle$ and the half life of a photon in the resonant mode of optical cavity 120. For an N-V defect, wait time $T_{WAIT}$ is preferably on the order of about 15 ns. Step 240 then waits for a further relaxation time $T_{RELAX}$ for any remaining excitation in cavities 120 to relax. Relaxation time $T_{RELAX}$ should typically as long or longer than time $T_{WAIT}$, e.g., about 100 ns for an N-V defect. During these waits, system 100 evolves into a state $|\psi_2\rangle$ as shown Equation 3, where states $|0\rangle_i$ and $|1\rangle_i$ respectively identify states with 0 and 1 photon in mode 130-i for i equal to 1 or 2.

$$|\psi_1\rangle \xrightarrow{decay} |\psi_2\rangle = \frac{1}{2}[|\uparrow\uparrow\rangle|0\rangle_1|0\rangle_2 + |\uparrow\Downarrow\rangle|0\rangle_1|1\rangle_2 + |\Downarrow\uparrow\rangle|1\rangle_1|0\rangle_2 + |\Downarrow\Downarrow\rangle|1\rangle_1|1\rangle_2] \quad \text{Equation 3}$$

The action of beam splitter 152 transforms state $|\psi_2\rangle$ of Equation 3 to a state $|\psi_3\rangle$ such as shown in Equation 4. In Equation 4, states $|0\rangle_{i'}$, $|1\rangle_{i'}$, and $|2\rangle_{i'}$ respectively identify states with 0, 1, and 2 photons in a beam splitter output mode 135-i for i equal to 1 or 2. As shown in Equation 4, component states of state $|\psi_3\rangle$ having one photon in mode 135-1 or one photon in mode 135-2 correspond to entangled states of matter systems 110-1 and 110-2.

$$|\psi_2\rangle \xrightarrow{beam\ splitter} |\psi_3\rangle = \frac{1}{2}\Big[|\uparrow\uparrow\rangle|0\rangle_{1'}|0\rangle_{2'} + \frac{1}{\sqrt{2}}(|\uparrow\Downarrow\rangle + |\Downarrow\uparrow\rangle)|1\rangle_{1'}|0\rangle_{2'} + \frac{1}{\sqrt{2}}(|\uparrow\Downarrow\rangle - |\Downarrow\uparrow\rangle)|0\rangle_{1'}|1\rangle_{2'} + \frac{1}{\sqrt{2}}|\Downarrow\Downarrow\rangle(|2\rangle_{1'}|0\rangle_{2'} - |0\rangle_{1'}|2\rangle_{2'})\Big] \quad \text{Equation 4}$$

During step 230, measurement system 150 may fail to detect any photons, register a single detection event in one of detectors 154 or 156, or register two detection events in one of detectors 154 and 156. However, current photomultiplier based detectors are generally unable to resolve two photons arriving in quick succession, e.g., within 10 ns, and therefore may be unable to distinguish one photon from two photons.

Step 250 is a decision step that determines whether measurement system 150 has detected zero, one, or two photon events. If measurement system 150 detects zero or two photons, process 200 starts over, and step 210 again prepares the matter systems 110-1 and 110-2 in the desired initial state before entanglement process 200 resumes. On the other hand, if one (and only one) photo-detection event is observed, process 200 continues to step 260 for a second pass as described further below. If wait time $T_{WAIT}$ is sufficiently long and measurement system 150 can distinguish 0, 1, or 2 photons without errors, a measurement of exactly one photon emitted heralds that matter systems 110-1 and 110-2 are in an identified one of entangled states $$|B_1\rangle = \frac{1}{\sqrt{2}}(|\uparrow\Downarrow\rangle + |\Downarrow\uparrow\rangle) \text{ and } |B_2\rangle = \frac{1}{\sqrt{2}}(|\uparrow\Downarrow\rangle - |\Downarrow\uparrow\rangle).$$

Unitary operations can then be applied to the identified entangled state if necessary to produce a desired entangled state.

Current light detectors are generally subject to errors including failure to detect one or more photons, falsely indicating detection of a photon (i.e., dark counts), and failure to distinguish one photon from two photons. A classical measurement error that fails to signal detection of a single photon incorrectly indicates a failure to produce an entangled state, but this type of error merely decreases the efficiency of the entanglement operation. More problematic errors occur, when two photons are detected but the classical measurement signal indicates only a single photon event or when no photon is emitted but the detector registers a dark count. For these types of errors, the desired state is not produced, even though the classical measurement signal from the first pass heralds a successful entanglement operation. Dark counts may be controlled through proper detector design and using gated operation where the detectors are only on during the short period (10 ns) when emissions are expected. Accordingly, failure to distinguish two photons from a single photon is a much more likely error for current photomultiplier based detectors. If optical measurement system 150 incorrectly identifies a 2-photon signal as a 1-photon signal, matter systems 110-1 and 110-2 may be in state $|\Downarrow\Downarrow\rangle$, even though the first heralding, i.e., the classical measurement signal, appears to indicate a successful entanglement operation. If the probability of dark counts is assumed to be negligible, a photodiode providing a first measurement result indicating a single photon results in non-coherent combination of an entangled state $|B_i\rangle$ and the state $|\Downarrow\rangle$ as indicated by the density matrix $\rho$ shown in Equation 5. In Equation 5, $f(\eta)$ indicates the probability of failure to distinguish two photons, and index i is 1 or 2 depending of which detector 154 or 156 detected the photon event.

$$\rho = (1 - f(\eta))|B_i\rangle\langle B_i| + f(\eta)|\uparrow\uparrow\rangle\langle\uparrow\uparrow| \quad\quad \text{Equation 5}$$

After a measurement (correctly or incorrectly) indicates a successful entanglement, decision step 260 determines whether the second pass has been completed. If not, process 200 branches to step 270 and performs quantum coherent X operations on matter system 110-1 and 110-2. An X operation, which is also referred to as a NOT operation or bit flip for a qubit, coherently interchanges state $|\uparrow\rangle_i$ and state $|\downarrow\rangle_i$. For the exemplary embodiment using N-V defects in diamond, the X operation can be implemented by application of an ESR pulse of the appropriate energy and duration to cause a transition between states $|\uparrow\rangle_i$ and $|\downarrow\rangle_i$. X operations 270 do not change the entangled states $|B_1\rangle$ and $|B_2\rangle$, so that states of matter systems 110-1 and 110-2 remain entangled state if the measurement of a single photon during the first pass was correct. However, if the measurement during the first pass detected two photons and produced a classical measurement signal heralding a single photon, X operations 270 transform state $|\Downarrow\rangle$ corresponding to a 2-photon signal to state $|\uparrow\uparrow\rangle$. Similarly, X operations 270 transform state $|\uparrow\uparrow\rangle$ to state $|\Downarrow\rangle$.

Process 200, after X operation 270, returns to step 220 and applies π-pulses to excite any components of the states of matter systems 110-1 and 110-2 corresponding to state $|\downarrow\rangle$ to excited state $|e\rangle$. Optical measurement system 150 then detects photons emitted from cavities 120-1 and 120-2 during step 230. If matter systems 110-1 and 110-2 are in an entangled state, measurement system 150 should again measure exactly one emitted photon. However, if the measurement during the first pass corresponded to two photons producing a single photon event, no photons are emitted during the second pass, and entanglement process 200 starts over in step 210 by initializing the states of the matter systems 110-1 and 110-2 for redoing of the first pass.

Errors due to dark counts in detectors 154 and 156 can generally be controlled as noted above by restricting photon measurements to short time intervals, making the probability of dark counts low. However, some types of detectors have relatively higher probabilities of dark counts. If the first measurement signal from step 230 falsely indicated one photon when no photons where emitted, two photons should be measured during the second pass. In which case, process 200 branches from step 250 back to step 210 to restart the entanglement operation. However, the difficulty of distinguishing two photons from one photon with a photomultiplier-based detector can result in both measurements from step 230 including errors, which reduces the fidelity of entanglement process 200. In accordance with a further aspect of the invention, immunity to a dark count errors may be further improved using third or subsequent passes where successful entanglement is heralded by detection of a single photon during every pass. For example, for a 3-pass process, process 200 branches from step 260 to step 270 after the second measurement. In the case of a dark count in the first measurement and failure to identify two photons in the second measurement, the X operations in step 270 transform matter systems 110-1 and 110-2 back to state $|\uparrow\uparrow\rangle$, so that the third measurement should detect no photons. Since the chance of a dark count is low, the chance of dark counts in both the first and third measurement is even lower, so that the 3-pass entanglement process may achieve even higher fidelity. Further passes may be able to further improve fidelity of the entanglement operation.

After the desired number of measurements have been performed and indicate a successful entanglement, e.g., two consecutive measurements of a single photon for a double-heralded entanglement operation, decision step 260 determines that entanglement process 200 is done.

Process 200 as described above can achieve high fidelity where multiple classical measurement signals heralding successful entanglement have a very low probability of being wrong. The efficiency of process 200 can still remain near a theoretic maximum 50% for the exemplary initial state. In accordance with a further aspect of the invention, an entanglement process can exceed 50%, and even approach 100% efficiency, using non-absorbing photon detectors or non-absorbing parity detectors.

Figure 3:
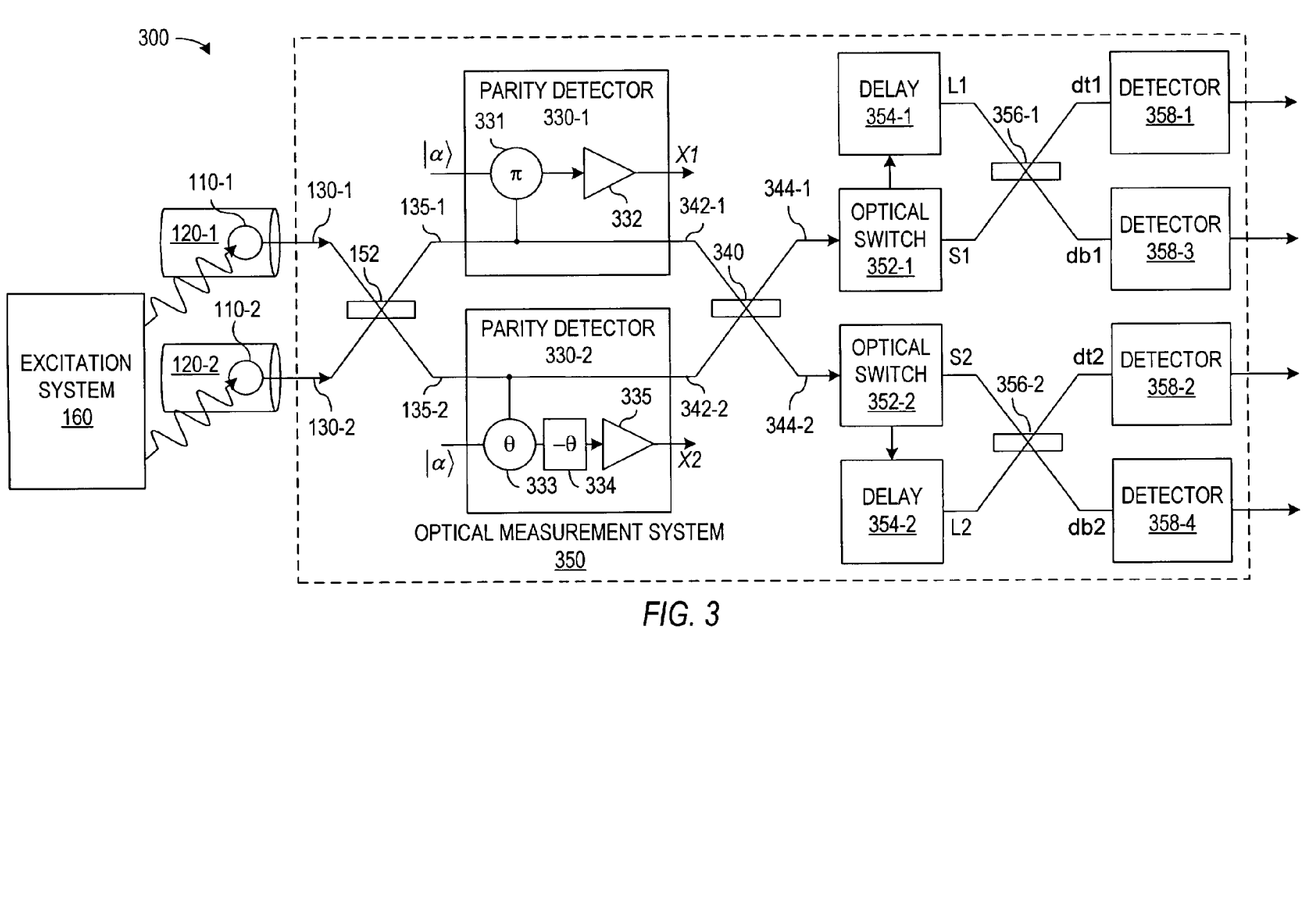
FIG. 3 shows a quantum coherent system in accordance with an embodiment of the invention using non-absorbing parity measurements of photonic modes for entanglement of the states of matter systems.

FIG. 3 schematically illustrates an exemplary embodiment of a quantum information system 300 in accordance with an embodiment of the invention with an optical measurement system 350 that includes non-absorbing parity detector 330-1 and 330-2. Non-absorbing parity detectors 330-1 and 330-2 are capable of measuring the respective parities of photonic output modes 135-1 and 135-2 of beam splitter 152. Each parity detector 330-1 or 330-2 provides a classical output signal X1 or X2 that indicates whether a corresponding mode 135-1 or 135-2 have even parity (i.e., a total of 0 or 2 photons) or odd parity (i.e., a total of 1 photon.)

FIG. 3 shows an atypical configuration of system 300 where parity detectors 330-1 and 330-2 have different structures. The different structures are shown in FIG. 3 primarily to illustrate some possible alternatives for the construction of parity detectors. In a more usual case, parity detectors 330-1 and 330-2 would be substantially identical to each other, e.g., both of same type as parity detector 330-1 or both of the same type as parity detector 330-2.

In the illustrated embodiment, parity detector 330-1 includes a controlled phase gate 331 having a phase shift constant π. A photonic probe state $|\alpha\rangle$, which may be a coherent state generated by a laser or other photon source, passes through controlled phase gate 331. Output mode 135-1 from beam splitter 152 controls phase gate 331, so that controlled phase gate 331 causes a phase shift 0, π, or 2π in probe state $|\alpha\rangle$ depending on whether mode 135-1 contains zero, one, or two photons. The phase shift of 2π is equivalent to no phase shift, so that parity detector 330-1 cannot distinguish the 2-photon state from the 0-photon state. A phase detector 332 measures the phase shift in the probe state and produces a classical signal X1 indicating a result of the measurement. Measurement signal X1 indicating a phase shift with magnitude zero indicates even parity (i.e., zero or two photons) in mode 135-1. A measurement X1 indicating a phase shift with magnitude π indicates odd parity (i.e., one photon) in mode 135-1. Phase gate 331 can employ a structure providing a relatively large Kerr non-linearity. Such non-linearities can be produced using electromagnetically induced transparency (EIT) such as described by W. J. Munro, K. Nemoto, R. G. Beausoleil, and T. P. Spiller, "A High-Efficiency Quantum Non-Demolition Single Photon Number Resolving Detector", Phys. Rev. A 71, 033819 (2005). However, in general, smaller non-linearities are easier to produce.

Non-absorbing parity detector 330-2 illustrates a structure that can use a relatively small Kerr non-linearity to measure the parity of photons in mode 135-2. As shown in FIG. 3, parity detector 330-2 includes a controlled phase gate 333, a phase shifter 334, and a phase shift magnitude detector 335. Controlled phase gate 333 has a phase shift constant θ that can be much less than π. A photonic probe state |α⟩, which may be a coherent state generated by a laser or other photon source, passes through controlled phase gate 333 and phase shifter 334 before being measured by detector 335. Output mode 135-2 from beam splitter 152 controls phase gate 333, so that controlled phase gate 333 causes a phase shift 0, θ, or 2θ in probe state |α⟩ depending on whether mode 135-2 contains zero, one, or two photons. Phase shifter 334 causes a fixed phase shift −θ, so that probe state |α⟩ entering detector 335 has a phase shift of −θ, 0, or θ depending on whether mode 135-2 contains 0, 1, or 2 photons. Phase detector 335 measures the magnitude of the phase shift in probe state |α⟩ and produces a classical signal X2 indicating a result of the measurement. A measurement X2 indicating a phase shift with magnitude zero indicates odd parity (i.e., one photon) in mode 135-2. A measurement X2 indicating a phase shift magnitude of |θ| indicates even parity (i.e., zero or two photons) in mode 135-2.

Parity detectors 3220-1 and 330-2 are non-absorbing and maintain the coherence of the photon states of modes 135-1 and 135-2. Accordingly, photons in modes 135-1 and 135-2 pass through respective parity detectors 330-1 and 330-2 to respective input modes 342-1 and 342-2 of a 50-50 beam splitter 340. Subsequent manipulation and measurements of the photons can be use to implement entanglement operations with high fidelity and efficiency. In the embodiment of FIG. 3, optical switches 352-1 and 352-2, optical delays 354-1 and 354-2, 50-50 beam splitters 356-1 and 356-2, and detectors 358-1, 358-2, 358-3, and 358-4 manipulate and measure the photons to achieve a desired entanglement of the states of matter systems 110-1 and 110-2.

Figure 4:
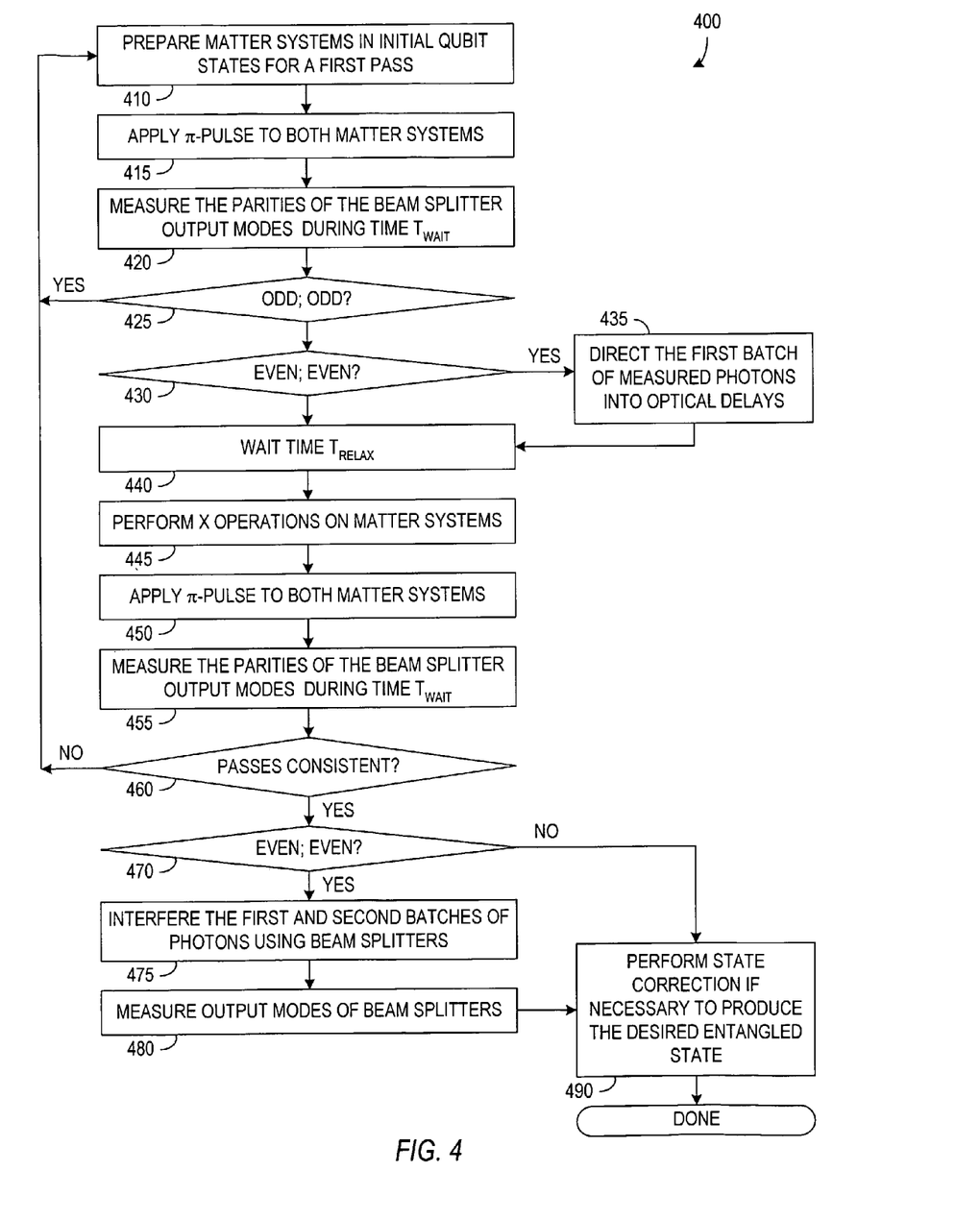
FIG. 4 is a flow diagram of an entanglement process in accordance with an embodiment of the invention using non-absorbing parity measurements.

FIG. 4 is a flow diagram of an entanglement process 400 that can be implemented in system 300 to efficiently entangle the states of matter systems 110-1 and 110-2. Process 400 begins by initializing the states of matter systems 110-1 and 110-2 in a step 410 and then applying π-pulses to matter systems 110-1 and 110-2 in a step 415. Steps 410 and 415 can be conducted in the same manner as described above for steps 210 and 220 of process 200. For illustrative purposes, the following describes the example where the initial state of system 300 is state |ψ$_0$⟩ shown in Equation 1 above, so that the π-pulses applied in step 415 transform the initial state as shown in Equation 2. It should be understood that other initial states could also be used with similar results.

After the initial state has been prepared and excited, parity detectors 330-1 and 330-2 in step 420 measure the parities of the states of respective output channels 135-1 and 135-2 of beam splitter 152. With the exemplary initial states of matter systems 110-1 and 110-2, system 300 just before the measurement of parities is in the state of Equation 4 above, provided that the exemplary initial states are used. The measurement results from parity detectors 330-1 and 330-2 should be "odd; even," "even; odd," or "even; even." A measurement indicating "odd; odd" is not allowed because beam splitter 152 cause the photon bunching, and measurement results "odd; odd" therefore indicate an error. Accordingly, if parity detectors 330-1 and 330-2 indicate both modes 135-1 and 135-2 have odd parity, process 400 restarts by branching from decision step 425 back to step 410. Measurements "odd; even" and "even; odd" respectively indicate entangled states |B$_1$⟩ and |B$_2$⟩. Measurement "even; even" indicates that state of matter systems 110-1 and 110-2 is in the Hilbert space spanned by states |↑↑⟩ and |↓⟩ but further work is required to produce an entangled state.

The parity measurements do not decohere the photon states, so that beam splitter 340 can undo the bunching of photons that beam splitter 152 caused. Photons from the output modes 344-1 and 344-2 of beam splitter 340 respectively enter optical switches 352-1 and 352-2. If the measurement results from step 420 were "even; even", a decision step 430 activates optical switches 352-1 and 352-2 to direct the measured photons into respective optical delays 354-1 and 354-2. Such delays 354-1 and 354-2 may simply be a relatively long optical path to respective beam splitters 356-1 and 356-2. The measured photons can be discarded for measurement results "odd; even" or "even; odd."

After step 430 or 435, a step 440 waits the relaxation time T$_{RELAX}$ before step 445 performs X operations on matter systems 110-1 and 110-2. Step 450 then applies π-pulses to matter systems 110-1 and 110-2, and step 455 again measures the parities of output modes 135-1 and 135-2 during a time when cavities 120-1 and 120-2 release photons produced by the decay of the excited states of matter systems 110-1 and 110-2.

Step 460 compares the parity measurements of step 420 to the parity measurements of step 455 to determine whether the measurements are consistent. Measurement results "odd; odd" in either step 420 or 455 indicate an error, causing process 400 to branch from step 460 to step 410. If step 420 measured "odd; even" or "even; odd", step 455 should produce the same measure results "odd; even" or "even; odd." In either of these cases, an entangled state has been successfully produced, and step 490 can perform unitary operation on individual matter system 110-1 or 110-2 if necessary to produce the desired entangled state.

If both measurement steps 420 and 455 both produce measurement result "even; even," decision step 470 causes process 400 to branch to step 475. During step 475 the second batch of photons, which had parities measured in step 455, pass through detectors 330-1 and 330-2 to beam splitter 340, from beam splitter 340 to optical switches 352-1 and 352-2, and from optical switches 352-1 and 352-2 to input modes S1 and S2 of beam splitters 356-1 and 356-2. Delays 354-1 and 354-2 provide delays such that the first batch of photons, which were produce after the first excitation of matter systems 110-1 and 110-2, are directed toward beam splitters 356-1 and 356-2 at the same time that optical switches 352-1 and 352-2 direct the second batch of photons toward beam splitters 356-1 and 356-2. Before the action of beam splitters 356-1 and 356-2 on the photons, system 300 will be in a state |ψ$_4$⟩ given in Equation 6 if both measurement steps 420 and 455 produce results "even; even." In Equation 6, subscripts L1 and L2 indicate the delayed photons and subscripts S1 and S2 indicate photons directly from optical switches 352-1 and 352-2.

$$|\psi_4\rangle = \frac{1}{\sqrt{2}}\big[|\uparrow\uparrow\rangle|1\rangle_{L1}|1\rangle_{L2}|0\rangle_{S1}|0\rangle_{S2} + |\downarrow\downarrow\rangle|0\rangle_{L1}|0\rangle_{L2}|1\rangle_{S1}|1\rangle_{S2}\big]$$

Equation 6

Beam splitter 356-1 interferes photons in modes L1 and S1, and beam splitter 356-2 interferes photons in modes L2 and S2. The operation of beam splitters permit measurement of the photons in output modes dt1 and db1 of beam splitter 356-1 and output modes dt2 and db2 of beam splitter, and such measurements do not distinguish whether the photons were subject to the first or second set of parity measurements. Detectors 358-1, 358-2, 358-3, and 358-4 measuring photonic modes dt1, db1, dt2, and db2 identify entangled states $$|B_3\rangle = \frac{1}{\sqrt{2}}[|\uparrow\uparrow\rangle + |\downarrow\downarrow\rangle] \text{ and } |B_4\rangle = \frac{1}{\sqrt{2}}[|\uparrow\uparrow\rangle - |\downarrow\downarrow\rangle]$$

of matter systems 110-1 and 110-2 as indicated in Table 1. In Table 1, "Click" indicates the detector corresponding to the mode registered a photon event, and "No Click" indicates the detector corresponding to the mode did not detect a photon. Results other than those listed in Table 1 indicate a measurement error.

TABLE 1

Entangled State Heralded by Two "Even; Even" Parity Measurements

| Mode dt1 | Mode db1 | Mode dt2 | Mode db2 | Identified State |
|---|---|---|---|---|
| Click | No Click | Click | No Click | $|B_3\rangle$ |
| No Click | Click | No Click | Click | $|B_3\rangle$ |
| No Click | Click | Click | No Click | $|B_4\rangle$ |
| Click | No Click | No Click | Click | $|B_4\rangle$ |

Process 400 as described above is thus able to produce an entangled state for all cases where parity measurements are consistent, i.e., absent an error. As a result, process 400 can approach 100% efficiency for a near deterministic entanglement operation and still provide the high fidelity resulting from double heralding.

For the entanglement processes 200 and 400 described above, the dominating system imperfections that may reduce the fidelity of the heralded entangled state can be divided into three classes: (1) decoherence of matter qubits 110-1 and 110-2; (2) dark counts in detectors 154 and 156; and (3) imperfect mode matching of the photons incident on beam splitter 150. The effect of spin decoherence of matter systems 110-1 and 110-2 depends on the way the states are generated, and can be estimated by comparing the spin decoherence time $T_D$ with the "clock time" $T_C$ that is provide for each quantum operation in a sequence. Clock time $T_C$ may, for example, be about $10\Gamma_{slow}^{-1}$. If the states of systems 110-1 and 110-2 are prepared in parallel during m clock cycles and assuming a reasonably strong cavity qubit coupling (e.g., about 100) and critically damped cavities 120-1 and 120-2, the size of errors due to spin decoherence can be estimated to be about $mT_C/2T_D \sim 0.4\gamma^{-1}/T_D$, where $\gamma$ is the rate of loss of photons from a cavity 120 to any mode other than modes 130-1 and 130-2 leading to measurement system 150 or 350. For instance, for the N-V diamond system at room temperature, the cavity decay time $\gamma^{-1}$ to loss modes is about 25 ns and decoherence time $T_D$ is about 32 μs, making the error is about $3\times10^{-4}$.

A detector dark count on either round of a double-heralded entanglement operation can lead to a spurious 'success' of the entanglement operation, which can reduce the fidelity of the entanglement. With existing avalanche photodiodes for detectors, dark count rates are typically less than about 500 $s^{-1}$. Dark counts can be made negligible by observing the detector output during a time $T_{WAIT}$ of about $3\Gamma_{slow}^{-1}$ or about 1 to 10 ns for NV-defects in diamond. The probability of a spurious dark counts for the NV-diamond system is therefore about $10^{-7}$ to $10^{-6}$. Thus, dark counts in such configurations should have a negligible effect on fidelity.

Imperfect mode matching of the photons emitted by the matter qubit-cavity systems reduces the fidelity because the photons carry information regarding their origin. In particular, non-identical central frequencies, different polarizations, and spatio-temporal mode shapes of the photons can all reduce the fidelity. The frequency of the photons emitted from a cavity 120-i depends on the photon frequency $\omega_{e\uparrow}$ associated with the transition of the excited state and the cavity mode frequencies $\omega_{ci}$ associated with cavity 120-i. The transition frequency $\omega_{e\uparrow}$ can be tuned independently, e.g., using local electric and magnetic fields to induce Stark and Zeeman shifts. The cavity mode frequencies $\omega_{ci}$ can also be accurately and independently tuned, e.g., using strain-tunable silica microcavities or piezoelectrically tuned fiber optic microcavities. The polarization of the emitted photons can be accurately matched using linear optical elements such as polarization rotators calibrated so that photons emitted from any cavity have the same polarization. The spatio-temporal mode shapes of the emitted photons depend on the couplings and the damping of the respective cavities. The coupling and damping parameters of a cavity in general, depend on the structure of the cavities, and hence are more difficult to calibrate once the cavities have been fabricated. However, it can be shown that the entanglement operation is rather robust to mismatches in the coupling and the damping parameters of cavities 120 and that mismatches of a few percent in the cavity parameters lead to a reduction in fidelity of less than $10^{-3}$.

Figure 5:
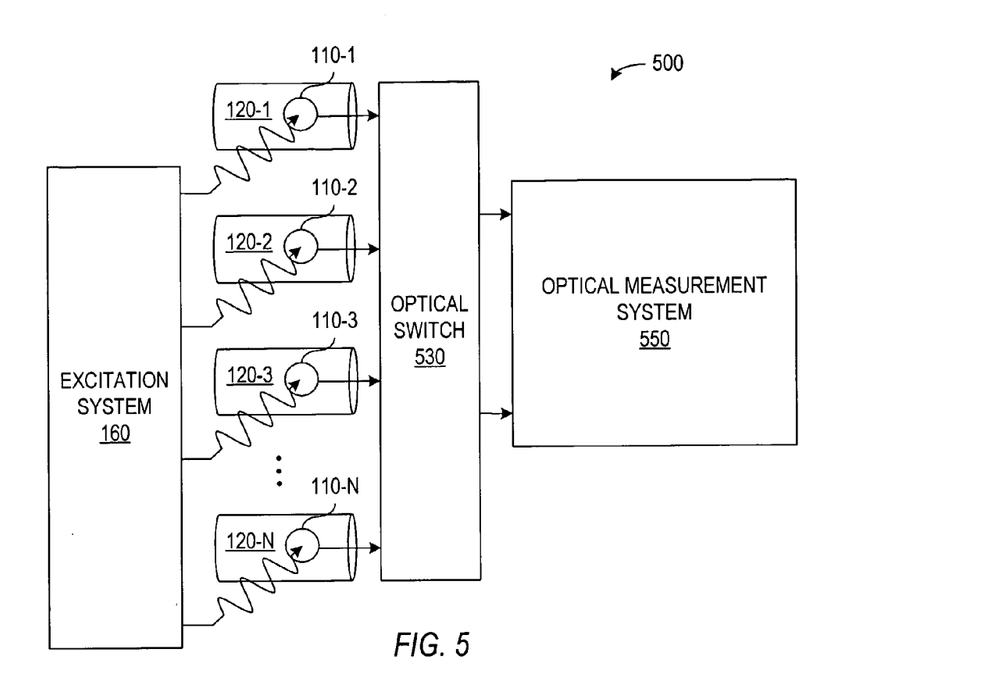
FIG. 5 shows a quantum coherent system in accordance with an embodiment of the invention using measurements of emitted photons to entangle and/or produce cluster states of multiple separated matter qubits.

In accordance with a further aspect of the invention, entanglement operations such as described above can be used to link qubits together into cluster states, for possible uses in scalable quantum computers. FIG. 5 shows an N-qubit system 500 suitable for construction cluster states. System 500 includes N matter systems 110-1 to 110-N, which are enclosed in respective cavities 120-1 to 120-N. As described above, each matter system 110-i has states $|\uparrow\rangle_i$ and $|\downarrow\rangle_i$ that correspond to the basis states of the ith qubit and an excited state $|e\rangle_i$ that couples solely to state $|\downarrow\rangle_i$ through single photon emission. In accordance with a principle of the present invention, matter systems 110 can be widely separated in a distributed quantum information system that uses optical fibers or other techniques to convey photons from the remote matter systems 110. Alternatively, some or all of matter systems 110 can be local and/or integrated into a single device.

Excitation system 160 can selectively drive any matter system 110-i with a π pulse corresponding to the transition from state $|\downarrow\rangle_i$ to state $|e\rangle_i$. Excitation system 160 may also be used to apply electromagnetic or other types pulses (e.g., ESR pulses) for single-qubit operations. Although shown as a single block in FIG. 5, excitation system 160 may be implemented using multiple separate systems, particularly when matter systems 110 are separate parts of a distributed quantum information system.

In the embodiment illustrated in FIG. 5, an optical switch or network 530 is positioned to receive photons that leak from cavities 120-1 to 120-N and to route output modes from any pair of cavities 120-1 to 120-N to measurement system 550. Measurement system 550 can be similar or identical to measurement system 150 or 350 as described above in regard to FIGS. 1 and 3. System 500 can thus perform an entanglement operation (e.g., process 200 of FIG. 2 or process 400 of FIG. 4) on that states of any pair of matter systems 110-i and 110-j (for i≠j) that optical switch 530 selects. Alternative structures could also be employed for selection of matter systems 110-i and 110-j. For example, a generalized multi-port beam splitter can implement both qubit selection and interfere emitted photons for the required measurements.

System 500 can construct a cluster state by entangling the states of a pair of matter systems 110 when the state of at least one of the matter systems 110 in the pair is already entangled with the state of another matter system 110. In general, a one-dimensional cluster $|C\rangle_{1...N}$ of N qubits (a chain) may be represented in the form of Equation 7 where Zi represents the Pauli phase-flip operation acting on qubit i.

$$|C\rangle_{1...N} = (|\uparrow\rangle_1 + |\downarrow\rangle_1 Z_2)(|\uparrow\rangle_2 + |\downarrow\rangle_2 Z_3)\ldots(|\uparrow\rangle_N + |\downarrow\rangle_N)$$

Equation 7

Figure 6:
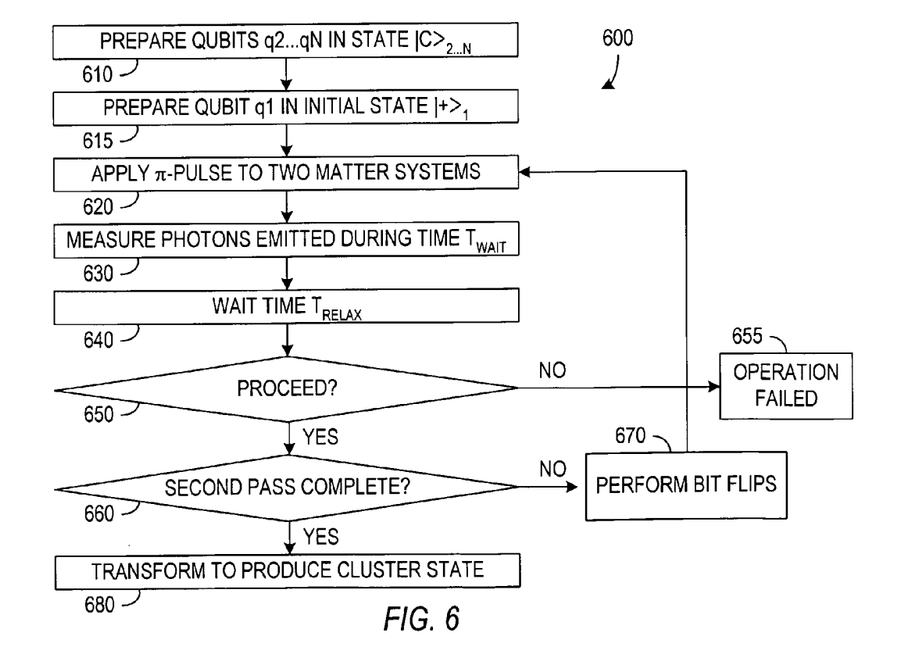
FIG. 6 is a flow diagram of process in accordance with an embodiment of the invention capable of producing cluster states of spatially separated matter systems.

In accordance with an aspect of the invention, a process 600 such as illustrated in the flow diagram of FIG. 6 can generate N-qubit o cluster state $|C\rangle_{1...N}$ from an (N−1)-qubit cluster $|C\rangle_{2...N}$ by entangling a qubit with a qubit in cluster state $|C\rangle_{2...N}$. Process 600 starts in steps 610 and 615 with the preparation of cluster state $|C\rangle_{2...N}$ and a single-qubit in an initial state. Cluster state $|C\rangle_{2...N}$ can be prepared by repeated use of process 600 starting from single qubits. The initial state $|+\rangle_1$ will be used in the following example, but other initial states could be employed. In the manner described above, π pulses are applied to matter systems, e.g., 110-1 and 110-2, respectively corresponding to the single qubit state $|+\rangle_1$ and the qubit at an end of the chain of qubits in cluster state $|C\rangle_{2...N}$. Steps 630 and 640 then measure photons produced during time $T_{WAIT}$ and then wait a relaxation time $T_{RELAX}$. The measurement during step 630 can be photon detection or parity measurements depending on the type of entanglement operation. Decision step 650 determines whether the first measurements indicate the entanglement process should proceed. If not, the entanglement operation failed, and process 600 branches to end step 655, which has the consequences described further below. If the first measurements indicate process 600 should proceed, decision step 260 begins a second pass by directing process 600 to step 670, which performs bit flip operations on matter systems involved in the entanglement operation. Steps 620, 630, and 640 are then repeated, and step 650 again determines whether the entanglement operation has failed.

If the entanglement operation is successful, the resulting state of matter systems 110-1 to 110-N will be one of the states $|\chi_1\rangle$, $|\chi_2\rangle$, $|\chi_3\rangle$, and $|\chi_4\rangle$ of Equations 8 when step 660 determines that the second pass is complete. The measurement results during the two repetitions of step 630 specifically indicate which state $|\chi_1\rangle$, $|\chi_2\rangle$, $|\chi_3\rangle$, or $|\chi_4\rangle$ was produced. Step 680 can then perform local transformations on qubits 1 and 2 to produce the desired cluster state. Using entanglement process 200 in process 600 produces either state $|\chi_1\rangle$ or $|\chi_2\rangle$, depending on which of detector 154 or 156 detected the photon during the last measurement step 630. Using entanglement process 400 in process 600 produces states $|\chi_1\rangle$ and $|\chi_2\rangle$ when the results of the parity measurements are respectively "odd; even" and "even; odd." States $|\chi_1\rangle$ and $|\chi_2\rangle$ can be transformed into a one-dimensional cluster state by applying the respective local operations $H_1 X_2$ and $X_1 H_1 X_2$, where $H_i$ is a Hadamard operation on the ith matter qubit, and $X_i$ the Pauli operator implementing a bit flip on the ith qubit. When the parity measurement results during entanglement process 400 are both "even; even", state $|\chi_3\rangle$ or $|\chi_4\rangle$ is produced depending on the measurement results from detectors 358-1 to 358-4. (See Table 1.) State $|\chi_3\rangle$ can be converted to a one-dimensional cluster state through application of local Hadamard operation $H_1$, and state $|\chi_4\rangle$ can be converted to a one-dimensional cluster state through application of local operation $X_1 H_1$.

$$|\chi_1\rangle = (|\uparrow\rangle_1|\downarrow\rangle_2 + |\downarrow\rangle_1|\uparrow\rangle_2 Z_3)|C\rangle_{3...N}$$
$$|\chi_2\rangle = (|\uparrow\rangle_1|\downarrow\rangle_2 - |\downarrow\rangle_1|\uparrow\rangle_2 Z_3)|C\rangle_{3...N}$$
$$|\chi_3\rangle = (|\uparrow\rangle_1|\uparrow\rangle_2 + |\downarrow\rangle_1|\downarrow\rangle_2 Z_3)|C\rangle_{3...N}$$
$$|\chi_4\rangle = (|\uparrow\rangle_1|\uparrow\rangle_2 - |\downarrow\rangle_1|\downarrow\rangle_2 Z_3)|C\rangle_{3...N}$$

Equations 8

If the entanglement operation fails, i.e., process 600 branches to step 655, and in general, the state of qubit 2 is unknown. However, measuring qubit 2 in the computational basis removes qubit 2 from the cluster and projects qubits {3 . . . N} back into a pure cluster state $|C\rangle_{3...N}$. Therefore, failure of operation 600 causes the original cluster to shrink by one qubit.

Repeatedly applying process 600 as described above allows long chains to be grown. However, the theoretical upper limit on the success probability p of process 600 using entanglement process 200 is ½, and when the entanglement operation fails, the chain shrinks by 1 qubit. Therefore, process 600 using entanglement process 200 alone cannot create large clusters efficiently. If recycling of the cluster state after a failure of an entanglement operation is not performed, the average number of entanglement operations required to create a cluster of m qubits is $$N_{EO} = \sum_{i=1}^{m-1} p^{-i} = p^{1-m}(1-p^{m-2})/(1-p),$$

where p is the probability of the entanglement operation succeeding. Accordingly, the average number $N_{EO}$ of entanglement operations required grows exponentially with the number m of qubits in the cluster. Even using entanglement operation 400 of FIG. 4, which has an efficiency p that is not theoretically bounded to ½ but can approach 1, may require a large number of entanglement operations to produce a large cluster state.

Figure 7:
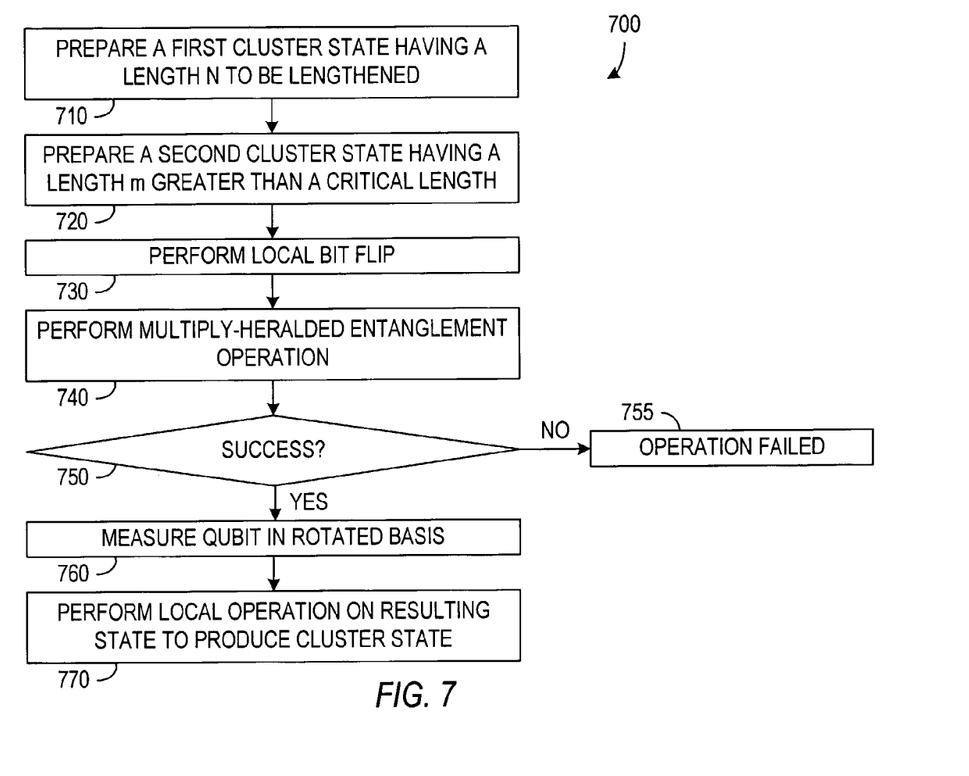
FIG. 7 illustrates a process in accordance with an embodiment of the invention that uses a multiply-heralded entanglement operation to join cluster states and form a larger cluster state.

In accordance with a further aspect of the invention, large cluster states can be more efficiency generated by growing a cluster state up to a critical size that depends on entanglement success probability p and then using the entanglement operation together with local operations to join the cluster state having the critical length to a cluster state being lengthened. In particular, FIG. 7 is a flow diagram of a process 700 for producing longer one-dimensional cluster states. Process 700 begins with steps 710 and 720 of producing first cluster state of length N to be lengthened and a second cluster state of length m that is at least of the critical length. The first and second cluster states can be produced using process 600 of FIG. 6 or process 700 of FIG. 7. The state of a system including sets of qubits in the two one-dimensional cluster states may be written as shown in Equation 9. In Equation 9, states $|C\rangle_{\{A\}}$ and $|C\rangle_{\{B\}}$ respectively represents one-dimensional cluster states of qubits {A2 . . . AN} and {B2 . . . Bm}.

$$(|C\rangle_{\{A\}}|\uparrow\rangle_{A1} + Z_{A2}|C\rangle_{\{A\}}|\downarrow\rangle_{A1})(|C\rangle_{\{B\}}|\uparrow\rangle_{B1} + Z_{B2}|C\rangle_{\{B\}}|\downarrow\rangle_{B1})$$

Equation 9

The first and second cluster states $|C\rangle_{\{A\}}$ and $|C\rangle_{\{B\}}$ can be joined by first performing a local operation $X_{A1}$ on an end qubit of cluster state $|C\rangle_{\{A\}}$ in step 730 and then in step 740 performing an entanglement operation between qubit A1 and an end qubit B1 of cluster state $|C\rangle_{\{B\}}$. If step 750 determines the entanglement operation is successful, step 760 measures qubit B1 in a rotated basis $|\pm\rangle_{B1}=|\downarrow\rangle_{B1}\pm|\uparrow\rangle_{B1}$, and the qubits remaining after measurement 760 are left in a state of Equation 10. In Equation 10, the first sign depends on the outcome of the measurement of qubit B1, and the second sign depends on the measurement results during the entanglement operation. Step 770 performs a local operation on qubit A1 yields to transform the unmeasured qubits to a cluster state of qubits {AN, . . . A1, B2, . . . Bm} having length N+m−1. If the entanglement operation fails, qubit A1 can be measured in the computational basis, and the original cluster state shrinks by 1 qubit. Thus, the average length L of the new cluster is p(N+m−1)+(1−p)(N−1). In order that the cluster grows on average, the average length L must be greater than the length N of the cluster state being extended, which implies that length m of the other cluster state should be greater than a critical length 1/p.

$$\pm|\uparrow\rangle_{A1}|C\rangle_{\{A\}}|C\rangle_{\{B\}} \pm |\downarrow\rangle_{A1}Z_{A2}|C\rangle_{\{A\}}|C\rangle_{\{B\}} \quad \text{Equation 10}$$

Chains of fixed length m can be grown independently by sequentially adding single qubits as in process 600 of FIG. 6 or by the end-to-end joining of multi-qubit clusters. Growing these m-qubit chains adds a constant overhead cost to the cluster growth process. For example, growing a 4-qubit chain (without recycling) requires on average $p^{-3}+p^{-2}+p^{-1}$ attempted entanglement operations, and each attempt to join such a chain adds on average 4p−1 qubits to the large cluster, leading to a fixed total cost of $C4=(p^{-3}+p^{-2}+p^{-1}+1)/(4p-1)$ entanglement operations per qubit added to the large cluster. Joining two 3-chains together can grow a 5-chain. Joining such 5-chains to a longer cluster leads to a total cost of $C5=(2p^{-3}+2p^{-2}+p^{-1}+1)/(5p-1)$ entanglement operations per qubit.

To minimize these costs, the collection and detection efficiencies of the system should be maximized. However, process 700 can successfully grow cluster states even when the probability is small, e.g., less than ¼. For example, for probability p about equal to 0.24 (or η=70% with γ=0), the critical length mc is 5, and the average cost C5 to produce a one-dimensional cluster state of length 5 is 775 entanglement operations. A modest improvement in detector efficiency dramatically reduces the overhead cost: for η=85% and γ=0, we find C4=73.4. Efficiency for growing clusters may be improved using entanglement operations and recycling of small clusters to lower overhead costs.

One-dimensional clusters are generally not sufficient for simulating arbitrary logic networks, and therefore it is desirable to be able to generate more general graph states. In accordance with an aspect of the invention, the entanglement operations disclosed above can be used for creating vertical bonds between cluster states and for constructing two-dimensional or higher-dimensional cluster states. One such technique for combining one-dimensional cluster states to form two-dimensional cluster states capable of simulating arbitrary logic networks begins by constructing two one-dimensional cluster states (e.g., using the techniques described above) and then entangling a qubit that is from the first one-dimensional cluster but is not at the end of the first one-dimensional cluster state with a qubit that is from the second one-dimensional cluster state but not at the end of the second one-dimensional cluster state. If the entanglement operation is successful, single-qubit operations can then be used to produce a cluster state corresponding to an I-shaped structure. Further, qubits, one-dimensional cluster states, or higher-dimensional cluster states can then be attached using entanglement operations on target qubits.

Other techniques for using entanglement operations to construct higher-dimensional cluster states are known and could employ the entanglement operations in accordance with the present invention. For example, Browne and Rudolph, Phys. Rev. Lett. 95, 010501 (2005) describes a technique using measurements to convert a qubit in linear chain to a dangling bond or "cherry" that can be entangled with other "dangling bond" qubits to create vertical bonds between linear chains. Such techniques have the advantage that a failed entanglement operation does not break the linear chains in two, but only shortens the chains.

Some embodiments of the invention as described above can provide very desirable features. First, the matter systems require only a simple level structure and single-qubit operations. Second, photon loss does not reduce the fidelity of the entangled state of the qubits, but merely adds to the constant overhead cost. Third, owing to the simplicity of the optical networks, mode matching is relatively straightforward. Fourth, the entanglement operation is inherently distributed so that individual qubit-cavity systems can be placed at distant sites, and connected by optical fibers. Accordingly, embodiments of the invention can be used in distributed applications such as quantum repeaters and quantum cryptography.

Although the invention has been described with reference to particular embodiments, the description is only an example of the invention's application and should not be taken as a limitation. Various adaptations and combinations of features of the embodiments disclosed are within the scope of the invention as defined by the following claims.

We claim:

1. A process comprising:
   exciting a first system using an excitation that transforms a first state of the first system to an excited state of the first system;
   exciting a second system using an excitation that transforms a first state of the second system to an excited state of the second system;
   performing a first measurement of photonic modes corresponding to transitions from the excited states respectively to the first states, wherein the first measurement is unable to distinguish whether photons originated from the first system or the second system;
   performing operations on the first system and the second system, wherein each of the operations transforms the first state of the system to a second state of the system and transforms the second state of the system to the first state of the system;
   after performing the operations, exciting the first system and the second system using the excitations that transform the first states to the excited states respectively associated with the first system and the second system; and
   performing a second measurement of the photonic modes, wherein the second measurement is unable to distinguish whether photons originated from the first system or the second system, and measurement results of the first and second measurements indicate whether the process successfully entangled quantum states of the first system and the second system.

2. The process of claim 1, wherein each of the first system and the second system comprises a matter system selected from a group consisting of a trapped atomic system, a trapped molecular system, a trapped ion system, an N-V defect in diamond, and a quantum dot.

3. The process of claim 1, wherein exciting the first system comprises applying a π-pulse that causes the first system to transition from the first state of the first system to the excited state of the first system.

4. The process of claim 1, wherein the first and second states of the first system are basis states of a first qubit, and the first and second states of the second system are basis states of a second qubit.

5. The process of claim 4, wherein performing the operations comprises performing a first bit-flip operation on the first qubit and performing a second bit-flip operation on the second qubit.

6. The process of claim 1, wherein performing the first measurement comprises inputting the photonic modes to a beam splitter, and detecting photons in output modes of the beam splitter.

7. The process of claim 6, wherein detection of one photon during each of the first and second measurements indicates that the process successfully entangled quantum states of the first system and the second system.

8. The process of claim 7, further comprising responding to a failure to detect a photon during the first measurement or the second measurement by restarting the process.

9. The process of claim 1, wherein performing the first measurement comprises measuring a parity of a photonic mode into which photons from transitions from the excited states are directed.

10. The process of claim 9, wherein performing the second measurement comprises measuring a parity of the photonic mode into which photons from transitions from the excited states are directed.

11. The process of claim 9, wherein performing the first and second measurements comprises using a non-absorbing parity detector, and wherein the process further comprises:
delaying photons measured during the first measurement;
interfering the photons measured during the first measurement with photons measured during the second measurement; and
measuring the photons after the interfering, wherein this measuring does not distinguish whether the photons were produced before or after performing the operations, and results of this measuring of the photons identifies an entangled state of the first system and the second system.

12. The process of claim 1, wherein the excitation that transforms the first state of the first system to the excited state of the first system is unable to transform the second state of the first system to the excited state of the first system.

13. The process of claim 1, further comprising setting the first system in an initial state of the first system that is a linear combination of the first and second states of the first system.

14. The process of claim 1, wherein after performing the second measurement, the process further comprises one or more repetition of:
performing the operations on the first system and the second system;
exciting the first system and the second system using the excitations that transform the first states to the excited states respectively associated with the first system and the second system; and
performing a further measurement of the photonic modes, wherein each further measurement is unable to distinguish whether detected photons originated from the first system or the second system, and a combination of results from all of the measurements is required to herald a successful entanglement of the first system and the second system.

15. The process of claim 1, wherein the first system and the second system are separated matter systems in a distributed quantum information system.

16. The process of claim 1, wherein the first system and the second system are integrated into a single device.

17. The process of claim 1, wherein the first system represents a qubit that initially is a portion of a first cluster state, and the process produces a second cluster state containing more qubits than are in the first cluster state.

18. The process of claim 1, wherein that first system represents a first qubit that is initially a portion of a first cluster state, the second system represents a second qubit that is initially a portion of a second cluster state, and the process produces a higher-dimensional cluster state.

19. A process comprising:
exciting a first system using an excitation that transforms a first state of the first system to an excited state of the first system;
exciting a second system using an excitation that transforms a first state of the second system to an excited state of the second system;
measuring one or more parities of one or more photonic modes corresponding transitions from the excited states respectively to the first states, wherein measuring the parities does not absorb photons; and
delaying a first batch of photons from the one or more photonic modes;
performing operations respectively on the first system and the second system, wherein each of the operations transforms the first state of the system to a second state of the system and transforms the second state of the system to the first state of the system;
after performing the operations, exciting the first system and the second system using the excitations that transform the first states to the excited states respectively associated with the first system and the second system; and
remeasuring the one or more parities of the one or more photonic modes; and
combining the first batch of photons with a second batch of photons from the one or more photonic modes to produce a combined photon state;
measuring the combined photon state in a manner such that this measuring does not distinguish when photons were produced, wherein results of this measuring of the combined photon state indicates an entangled state of the first system and the second system.

20. The process of claim 19, wherein parity results from the measuring and the remeasuring having a first value indicates successful entanglement without the combining or the measuring of the combined photon state, and the parity results having a second value indicates that the combining and the measuring of the combined photons is needed to produce a successful entanglement.

21. The process of claim 19, wherein each of the first system and the second system comprise a matter system selected from a group consisting of a trapped atomic system, a trapped molecular system, a trapped ion system, an N-V defect in diamond, and a quantum dot.

22. The process of claim 19, wherein the first system represents a qubit that initially is a portion of a first cluster state, and the process produces a second cluster state containing more qubits than are in the first cluster state.

23. The process of claim 19, wherein that first system represents a first qubit that is initially a portion of a first cluster state, the second system represents a second qubit that is initially a portion of a second cluster state, and the process produces a higher dimensional cluster state.

24. A system comprising:
a plurality of matter systems, wherein each matter system has a first state, a second state, and an excited state, and a photonic mode couples the excited state to the first state; and
an optical measurement system for measurement of the photonic modes of the matter systems, wherein the measurement system comprises:
a non-absorbing parity detector; and
an optical system capable of combining and measuring a first batch of photons passing through the non-absorbing parity detector during a first measurement with a second batch of photons passing through the non-absorbing parity detector during a second measurement, wherein the measurement in the optical system does not distinguish whether measured photons passed through the non-absorbing parity detector during the first or second measurement.

25. The system of claim 24, wherein the optical system comprises:
a beam splitter;
a delay path to the beam splitter; and
an optical switch that is operable to direct the first batch of photon into the delay path and the second batch or photons to the beam splitter so that the first and second batches of photons arrive at the beam splitter at substantially the same time.

26. The system of claim 24, wherein the matter systems are separated portions of a distributed quantum information system.

27. The system of claim 24, wherein the matter systems are integrated into a single device.

* * * * *